(12) United States Patent
Lu et al.

(10) Patent No.: US 7,897,701 B2
(45) Date of Patent: Mar. 1, 2011

(54) FAST CURING MOLD RELEASE COMPOSITIONS AND METHODS OF PREPARING SAME

(75) Inventors: Zheng Lu, South Glastonbury, CT (US); Joseph Schulz, Newington, CT (US)

(73) Assignee: Henkel Corporation, Rocky Hill, CT (US)

( * ) Notice: Subject to any disclaimer, the term of this patent is extended or adjusted under 35 U.S.C. 154(b) by 346 days.

(21) Appl. No.: 12/038,124

(22) Filed: Feb. 27, 2008

(65) Prior Publication Data

US 2008/0207818 A1 Aug. 28, 2008

Related U.S. Application Data

(60) Provisional application No. 60/903,969, filed on Feb. 28, 2007.

(51) Int. Cl.
*C08G 77/16* (2006.01)

(52) U.S. Cl. .......................................... 525/477; 528/34

(58) Field of Classification Search ................. 525/477; 528/34

See application file for complete search history.

(56) References Cited

U.S. PATENT DOCUMENTS

| 4,579,636 | A | * | 4/1986 | Inoue et al. ................... 522/99 |
| 6,284,385 | B1 | * | 9/2001 | Guillaumon et al. ........ 428/450 |
| 2006/0247368 | A1 | | 11/2006 | Lu et al. |

FOREIGN PATENT DOCUMENTS

| DE | 4231184 A1 | 3/1994 |
| WO | WO 2004/033172 A | 4/2004 |
| WO | WO 2005/012431 | 2/2005 |

* cited by examiner

*Primary Examiner*—Kuo-Liang Peng
(74) *Attorney, Agent, or Firm*—Steven C. Bauman

(57) ABSTRACT

A mold release composition comprising at least one siloxane polymer having functional terminal groups; at least one siloxane polymer having at least one functional pendent group; and a crosslinking agent. The mold release agent is ready to mold composite parts in less than 30 minutes under room temperature curing conditions.

19 Claims, 4 Drawing Sheets

FAST CURING MOLD RELEASE COMPOSITIONS AND METHODS OF PREPARING SAME

BACKGROUND OF THE INVENTION

1. Field of the Invention

This invention generally relates to room temperature condensation curing mold release compositions which are designed to cure within about 30 minute or less. These compositions use oil in water emulsions to provide a stabilized system, which when applied as a coating to a mold surface, quickly cures to a finish having high durability and low surface tension.

2. Brief Description of Related Technology

In recent years, the use of volatile organic compounds ("VOC") solvent systems has been discouraged due to their deleterious effect on the environment. In applications such as mold release compositions, the use of solvents must not only have a low VOC content but also evaporate quickly in order for the resin to cure in a commercially acceptable time. More recently, water based carriers have been employed in mold release compositions as alternatives for organic solvent carriers. For example, International Patent Publication No. WO 2005/012431 A1, to Henkel Corporation, describes mold release compositions which have a non-volatile organic carrier composition, a curable component comprising at least one crosslinker and at least one polyfunctional siloxane; where the mold composition when applied as a coating cures to a durability which permits at least five releases without transfer of mold release composition to a part. While such compositions have found commercial success and utility, they require longer than desirable periods of cure time. For example, such compositions may require up to three hours in some instances to properly cure in order for them to be used. There is a need for a composition which provides high durability and high release properties while also possessing the ability to quickly cure such that it can be used in a relatively short period of time subsequent to application to demold a past.

SUMMARY OF THE INVENTION

Among other things, the present invention provides a remedy to that need.

In one aspect of the invention, there is included a mold release composition including:

a) at least one siloxane polymer having functional terminal groups;
b) at least one siloxane polymer having at least one functional pendent group; and
c) a crosslinking agent.

In another aspect of the invention, there is provided a mold release composition including a) at least two siloxane polymers having functional pendent groups selected from amino, thio and halo groups; and
b) a crosslinking agent.

In another aspect of the invention, there is included a method of preparing a fast curing water-based mold release composition including:

a) providing a composition including:
  i) at least one siloxane polymer having functional terminal groups;
  ii) at least one siloxane polymer having at least one functional pendent group; and
  iii) a crosslinking agent; and
b) emulsifying the composition with water.

In still a further aspect of the invention, there is included a method of preparing a mold release coating including the steps of:

a) applying to a surface a mold release composition including:
  i) at least one siloxane polymer having functional terminal groups;
  ii) at least one siloxane polymer having at least one functional pendent group; and
  iii) a crosslinking agent; and
b) allowing the composition to cure.

In yet another aspect of the invention, there is included a method of preparing a stabilized emulsion of a mold release composition including the steps of:

a) forming a first oil-in-water emulsion comprising:
  i) a first component selected from at least one siloxane polymer having functional terminal groups, at least one polymer having functional pendent groups, a crosslinking agent and combinations thereof;
  ii) a second component comprising at least one surfactant; and
  iii) a third component comprising water;
b) forming a second oil-in-water emulsion comprising:
  i) a fourth component selected from at least one siloxane polymer having functional terminal groups, at least one polymer having functional pendent groups, a crosslinking agent and combinations thereof, where the selection for components in the second oil-in-water emulsion is different than the first oil-in-water emulsion;
  ii) a fifth component comprising at least one surfactant; and
  iii) a six component comprising water; and
c) combining the first oil-in-water emulsion with the second oil-in-water emulsion to form a third oil-in-water emulsion.

In yet another method of the present invention, there is included a method of preparing a stabilized emulsion of a mold release composition which includes the steps of:

a) forming a first oil-in-water emulsion including:
  i) a first component selected from at least one siloxane polymer having functional terminal groups, at least one polymer having functional pendent groups, a crosslinking agent and combinations;
  ii) a second component including at least one surfactant; and
  iii) a third component including water;
b) forming a second oil-in-water emulsion comprising:
  i) a fourth component selected from at least one siloxane polymer having functional terminal groups, at least one polymer having functional pendent groups, a crosslinking agent and combinations thereof, where the selection for components in the second oil-in-water emulsion is different than the first oil-in-water emulsion:
  ii) a fifth component comprising at least one surfactant; and
  iii) a six component comprising water; and
c) combining the first oil-in-water emulsion with the second oil-in-water emulsion to form a third oil-in-water emulsion.

In those embodiments which involve two or more pre-formed oil-in-water emulsions, each of these pre-formed emulsions may contain one or more of the different siloxane polymers (i.e., terminally functional and/or pendent functional) and a crosslinking agent, provided that the multiple pre-formed emulsions are not compositionally the same.

These pre-formed emulsions are then combined to form a final end product emulsion which serves as the release coating composition.

DETAILED DESCRIPTION OF THE INVENTION

Figure 1:
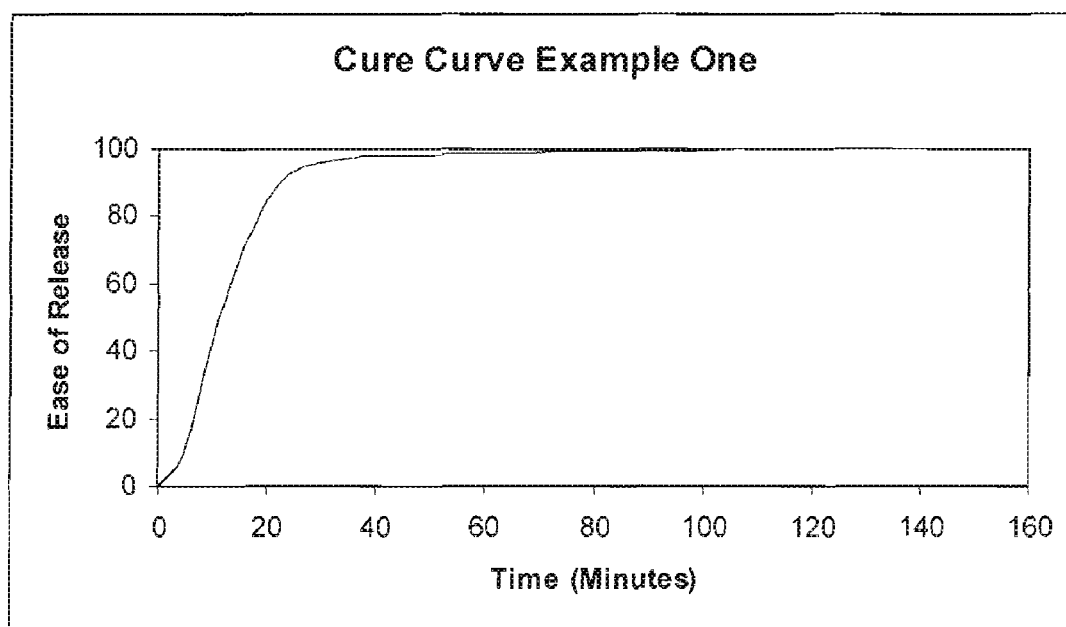
FIGS. 1 and 3 are graphical representations of the cure time verses ease of release of compositions of the invention.

The present invention is directed to room temperature condensation curing mold release compositions that once cured are durable and permit multiple releases when applied as a coating, but which particularly have the ability to cure in a very quick time, thereby allowing the mold to be available for use. The compositions provide a low surface energy as a coating and use a non-VOC or low-VOC carrier, in particular, a water based earner, which reduces environmental problems. Additionally, the present invention overcomes the prior art water based disadvantages of slow evaporation rates of a water and incompletion of condensation reaction which caused longer cure times and made the mold less available for immediate use. The present invention incorporates a polysiloxane having pendent function groups which are designed to provide distinct advantages over prior known water based compositions. In particular, the addition of the siloxane polymer having the functional pendent group facilitates the interaction of the total of composition with water thereby eliminating the need for higher surfactant levels in order to create a stable emulsion. Additionally, such pendent functional groups are hydrophilic in nature and have the ability to tie up residual water through mechanisms such as hydrogen bonding, which prevents such residual water from migrating to the surface and interfering with the mold process. In particular, it is important that the water carrier not react with the composite material forming the molded part. Thus, the pendent functional groups serve to minimize the migration of such residual water from surfacing without the need to wait for further drying time before the part is used. Moreover, these pendent functional groups coordinate with the metal surface of the mold which helps stabilize the coating and enhance the film formation of the release film on the surface. This is due to their tendency to turn away from the surface of the coating as the more hydrophobic portion of the siloxane polymer turns toward the surface.

In some embodiments of the invention, the siloxane polymer with functional pendent groups does not serve to crosslink with itself or the functionally terminated polysiloxane polymer. In such cases, either one or both of the terminal ends of this component do not have functional groups cable of crosslinking. In those embodiments, therefore, two siloxane polymers having functional pendent groups are used as the curing material.

The term "cure" or "curing", as used herein, refers to a change in state, condition and/or structure in a material that usually, but not necessarily, induced by one variable, such as time, temperature, moisture, radiation, presence and quantity in such material of a curing catalyst or accelerator, or the like. The terms cover partial as well as complete curing.

The curable mold release compositions of the present invention desirably are formed from a combination of a functionally terminated polysiloxane polymer, a polysiloxane polymer or copolymer having at least one and desirably more than one functional pendent group thereon and a crosslinking component.

Among the useful functionally terminated siloxane polymers include those which correspond to the structural formula I:

polysiloxanes are represented by the following general formula:

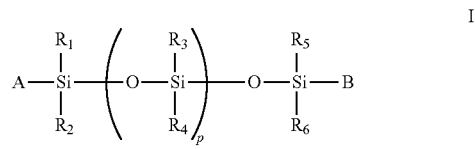

wherein $R^1$, $R^2$, $R^3$, $R^4$, $R^5$ and $R^6$ may be the same or different and may be $C_{1-6}$ alkyl; A and B may be the same or different and may be $C_{1-6}$ alkyl, $C_{2-6}$ allyl, $C_{1-4}$ alkoxy, hydroxy, carbinol, carboxy, acryloxy, acetoxy, halo, epoxypropoxypropyl, acryloxypropyl, aminopropyl or amino, and p is 1 to about 100,000.

The siloxane polymer (I) have functional terminal groups may be present in the composition in the amounts of about 0.1% to about 5.0% by weight of the total composition. Among those particularly useful are those which have alkoxy termination or other groups capable of undergoing condensation reactions to form crosslinked systems.

Among the useful siloxane polymers which have functional pendent groups are those which correspond to formula II:

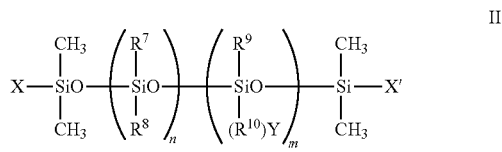

wherein X and X' may be same or different and may be selected from the group consisting of:

$C_{1-4}$ alkyl, $C_{1-4}$ alkoxyl, hydroxy, carbinol, acryloxy, acetoxy, halo, epoxypropoxypropyl, acryloxyhydroxypropyl, acryloxypropyl aminopropyl and amino;

Y is selected from the group consisting of H, $C_{1-10}$ alkyl, amino, thio and halo;

$R^7$, $R^8$, $R^9$ may be the same or different and may be H or $C_{1-6}$ alkyl;

$R^{10}$ is $C_{1-5}$ alkyl;

n is 1-50,000; and m is 1-200,

The siloxane polymer having functional pendent groups may be present in amount of about 0.2% to about 15.0% by weight of the total composition.

Of particular usefulness are those polymers having functional amino and/or thio pendent groups (Y) in combination with terminal groups (X, X') which are either alkoxy or alkyl. For example, terminal groups such as methyl or ethyl or methoxy or ethoxy are particularly useful in combination with amino and/or thio pendent functional group. For example, specific examples of such polymers are shown below as structural formulas III and IV.

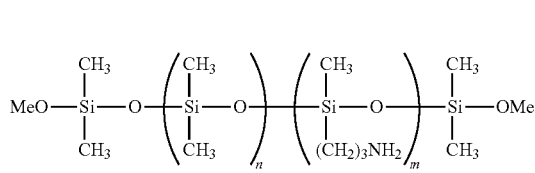

The amino functional polysiloxanes copolymer may be present in the compositions, for example, in an amount from about 0.2% to about 15% by weight in the final composition (w/w).

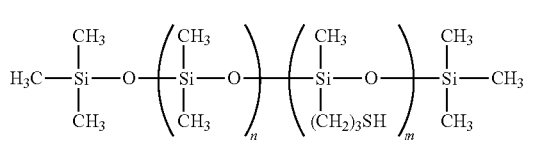

The thiol function copolymers may be present in the composition for example, in an amount from about 0 to about 5% by weight.

Among the useful crosslinking agents are those which correspond to the structural formula V:

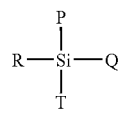

wherein R is H, $C_{1-2}$ alkyl or $C_{2-6}$ alkyl;

P, Q and T may be the same or different and may be H, alkoxy, acetoxy or halo.

The crosslinking agent may be present in amounts of about 0.2% to about 5.0% by weight of the total composition.

One particularly useful crosslinking agent is methyltriethoxysilane.

The functionally terminated siloxane polymer is used primarily to obtain a crosslinked composition. This polymer undergoes condensation reaction with the crosslinking agent to form a cured coating. The further addition of the siloxane polymer having functional pendent groups has a number of distinct advantages, among which are the ability of its pendent functional groups to participate in hydrogen bonding with available residual water during the curing process, providing increased stability to the coating composition and the ability to chemically coordinate with metal surfaces of the mold. These advantages serve to enhance the ability of the coating to reach a cured state or ready to use state in a faster time period, i.e., 30 minutes or less, as well as to enhance the overall performance and stability of the coating. Additionally, the presence of the pendent functional groups provide enhanced compatibility of the components forming the composition, as well as emulsions formed therefrom. Thus, shelf life is increased, as well as performance once applied.

There is a further advantage provided by the siloxane component having pendent functionality. That is, it serves as a viscosity modifier and eliminates the need for additional filler material which may otherwise be required for property viscosity adjustment.

In addition to the crosslinking agents set forth above, other suitable crosslinkers include, but are not limited to: a monomeric, cyclic, oligomeric or polymeric silazane, an amino-functional silazane, an enoxy functional silazane, a silicon hydride, an alkoxy functional silane, a methylethylketoxime functional silane, and acetoxy functional silane, an enoxy functional silane, an amino-functional silane and combinations thereof. More specifically, suitable crosslinkers include, but are not limited to, trismethylaminofunctional silane, trisenoxy functional silane, hydride functional silane and cyclic-trisilazane.

The compositions of the present invention may include a number of additional additives such as catalysts, dyes, cure modifying agents, fillers, viscosity modifying agents and combinations thereof.

For example, it may be desirable to include a condensation cure catalyst and/or heat to accelerate or otherwise promote the cure process. Any conventional catalyst may be employed provided the release properties of the compositions are not compromised. Suitable catalysts that may be used include conventional organometallic catalysts such as organic titanium derivatives and organic tin derivatives, tertiary amine compounds and certain early transition metal compounds. Generally, the catalyst is present in amounts of about 0 to 1.0 wt %. The concentration, however, may be varied depending upon the desired cure rate.

Additional additives include surfactants, wetting agents, pH adjusters such as acids and color indicators, such as pigments, dyes and UV trace dyes. The purpose of the color indicator is to allow users to easily identify the mold areas where the release composition is applied.

Surfactants are used primarily for creating premixed emulsion, which are then used in turn to create the final emulsion of the mold release composition. The hydrophilic portion of the surfactant is exterior to the formed micelle and the hydrophobic portion of the surfactant is internal to the micelle and interacts with the siloxane (oil) components. These premixed emulsions may use one or more surfactants to create a stabilized micelle of the components present. Desirably, two or more premixed emulsions are used to form the final composition. For example, one or more surfactants may be combined with the siloxane having terminal functional groups, and water to form a first pre-mixed emulsion. The emulsion is formed by introducing high shear to the mixture to form a stabilized emulsion system. High shear systems such as a microfluidizers, which combine one or more high pressure streams of the components to form the emulsion, may be used. For example, pressures up to 9,000 psi or more may be used. A second pre-mixed emulsion may include the siloxane polymer having functional pendant groups in combination with one or more surfactants and water. A similar process to form a stabilized emulsion comprising micelles is performed on this mixture. A third premixed emulsion may be used which includes the crosslinking component in combination with one or more surfactants and water. The three premixed emulsions may then be combined to form a final mold release product. Various combinations of the components may be used to form these premixed emulsions and the combinations recited above are not intended to limit the various permutations. Additionally, in some embodiments, a single emulsion containing all required components may be made.

In each of the premixed emulsions the ratios of surfactant to total material may be in the range of 1:4 to about 1:15. A particularly desirable ratio of surfactant to total premixed emulsion composition is 1:8, Suitable surfactants for use in formation of the premixed emulsions include those surfactants having an HLB number of about 6 to about 18. For example, suitable surfactant classes include, without limitation, alcohol polyethylene glycol ethers, alkyl alcohols ethoxylated, fatty amine polyethylene glycol ethers, alkyl phenol ethoxylateds, alkyl diphenyloxide disulfonates and polyakyleneoxide modified siloxanes. Useful commercially available surfactants include without limitation such brands as Silwet, Dowfax, Triton, and Lambent.

The final composition may be a mixture or emulsified blend of the premixed emulsions. Similar methodologies to combine the emulsions, i.e., high shear conditions such as high speed mixing or emulsification processes may be employed.

The final composition may employ additional wetting agents which are independent from those types of surfactants used to create the stabilized micelles in the premixed emulsions. The amount of wetting agent in the final composition may be about 0.05 to about 1% by weight of the total composition. The wetting agents used to add to the final composition include materials such as polyalkyleneoxide modified heptamethyl trisiloxane, which is available as Silwet L-77 from General Electric Co., or fluoroaliphatic polymer esters from 3M Corporation. The wetting is not used as an emulsifier, but as a surface tension reducer to spread out the coating and uniformly wet the mold surface upon application.

Additionally, the pH of the final composition may be adjusted through the use of acidic components such as acetic acid. The amount of acidic pH adjuster required may be determined with the measurement of pH of the final solution, which is desirably a pH of about 2 to about 7, and more desirably about 3 to about 5.

EXAMPLES

Example 1

This example describes a formulation of components used to make a release composition of the present invention. Table 1 depicts the weight percent of each of the following components in the composition: hydroxy terminated polydimethylsiloxane; surfactants, methyl triethoxy silane cross linker, siloxane copolymer having pendent amino functionality, acetic acid pH adjuster, condensation catalyst, and a carrier of water. The components were emulsified well in water in accordance with the invention. In one instance three separate pre-formed emulsion were made from the siloxane polymers and the crosslinkers, respectively and combined into a final emulsion. In another instance all components were mixed together and the final emulsion formed therefrom. The resulting compositions were applied to a surface by either wiping or spraying to form a film coating. The coating was exposed at ambient temperature for about 30 minutes to effect curing. As a result, the coating imparted release properties to the surface, whereby composite parts were released from the mold.

TABLE 1

| COMPONENT | WT. % |
| --- | --- |
| Hydroxy terminated siloxane | 0.5-0.8% |
| Amino functional coplymer PDMS | 3-10% |
| Water | 88-98% |
| Surfactants | 0.2-2% |
| Acetic acid | 0.1-0.5% |
| Catalyst | 0.05-0.5% |
| Wetting agent | 0.05-0.5% |
| Methyl triethoxy silane | 1-3% |

The composition of Example 1 was tested for its ability to cure to a useful release material within a short time period. FIG. 1 shows the ease of release profile as a function of cure time for this composition. As indicated by the graph, the ease of release steadily increased within the first 30 minutes until it reached a maximum ease of release. Within the time frame of 20-30 minutes, the mold reached release values which indicated it had sufficiently cured to be a useful release coating.

Figure 2:
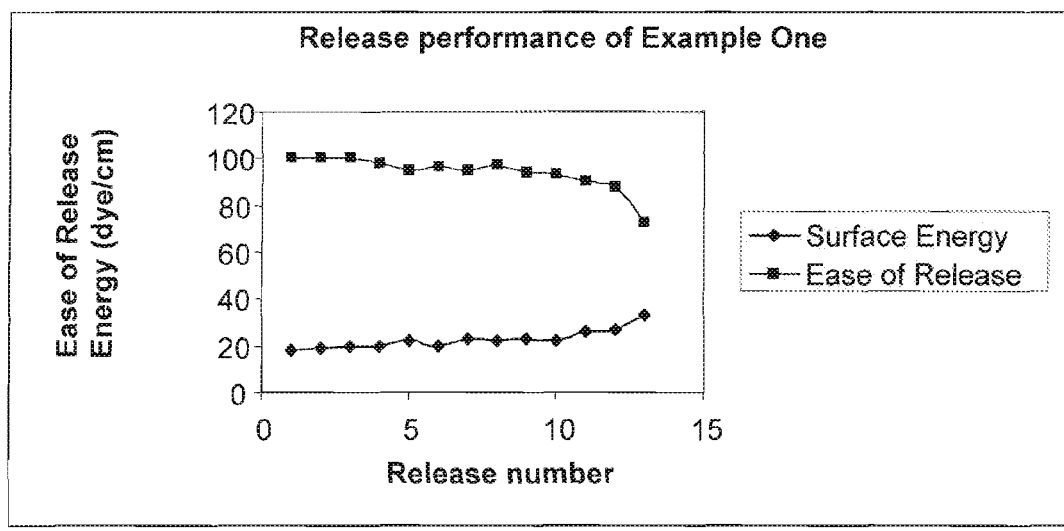
FIGS. 2 and 4 are graphical representations of the release performance of compositions of the invention.

FIG. 2 which also relates to Example 1, shows the correlation of the surface energy and ease of release as a function of the amount of energy required to obtain release of a part from a mold coated with the inventive composition. As indicated by the graph, the ease of release and amount of energy required to release the part from the mold coated with the composition remained substantially level over the first 11 uses (releases). This indicates the durability of the coating within a commercially acceptable release profile. After 11 releases, the energy required to release the part increased slightly. This also correlated with a decrease in surface energy.

This date suggests that after 11 releases, a "touch-up" coating may be useful to ensure ease of release values remain predictable and as low as possible and to ensure acceptable molded part results.

Example 2

This example describes another formulation of components used to make room temperature curing release composition of the present invention. Table 2 depicts the weight percent of each of the following components in the composition: an amino pendent PDMS copolymer; a thiol pendent PDMS copolymer; methyl terminated polydimethylsiloxane; methyl triethoxy silane; and a carrier of water; a catalyst, a wetting agent, surfactants, and acetic acid. The components were emulsified in water in accordance with the invention. The resulting composition was applied to a surface by either wiping or spraying to form a film coating. The coating was cured at ambient temperature for about 30 minutes to effect curing. As a result, the coating imparted release properties to the surface when molding with composite materials was performed. Example 2 was found to have slightly better shelf life than Example 1. Example 1 was found to have slightly better release performance than Example 2.

TABLE 2

| COMPONENT | WT. % |
| --- | --- |
| Methyl terminated PDMS | 0.05-0.2% |
| Amino functional coplymer PDMS | 2-10% |
| Water | 88-98% |
| Surfactants | 0.2-2% |
| Acid acid | 0.1-0.5% |
| Catalyst | 0.1-0.3% |
| Wetting agent | 0.1-0.5% |
| Methyl triethoxy silane | 1-5% |
| Thiol functional copolymer PDMS | 0.05-1% |

Figure 3:
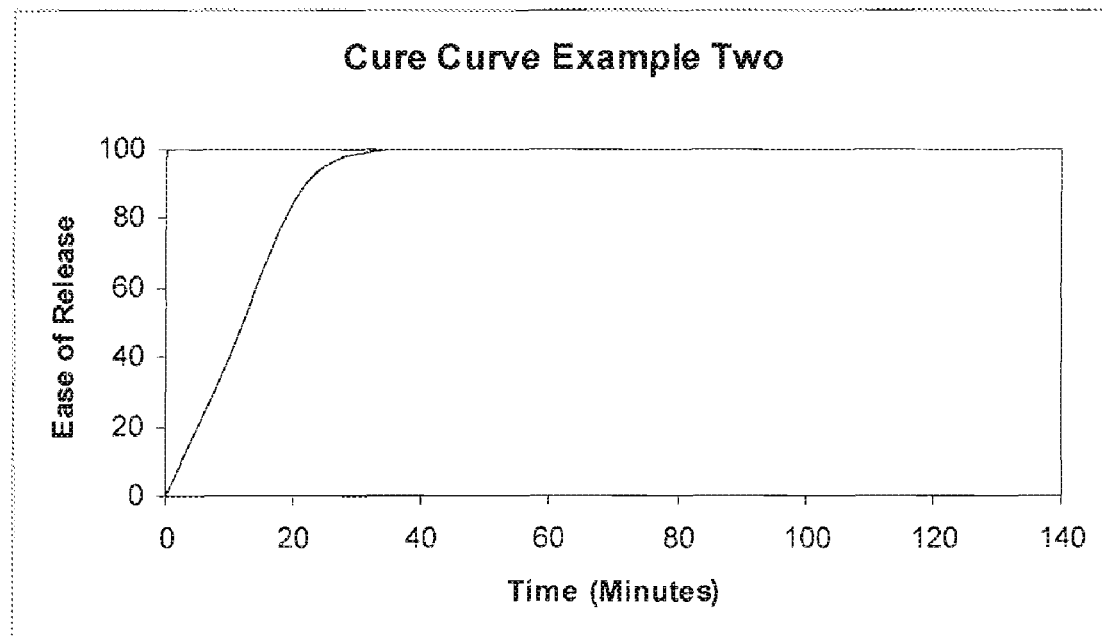

The composition of Example 2 was tested for its ability to cure to a useful release material within a short time period. FIG. 3 shows the ease of release profile as a function of cure time for this composition. As indicated by the graph, the ease of release steadily increased within the first 30 minutes until it reached a maximum ease of release. Within the time frame of 20-30 minutes, the mold reached release values which indicated it had sufficiently cured to be a useful release coating.

Figure 4:
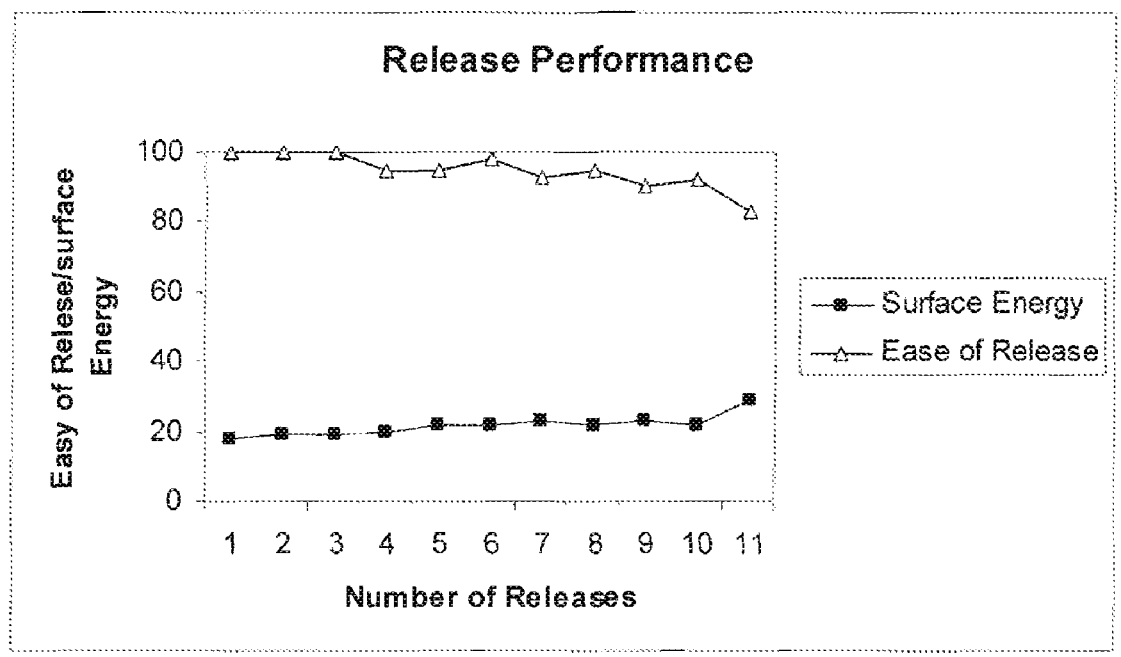

FIG. 4 which also relates to Example 2, shows the correlation of the surface energy and ease of release as a function of the amount of energy required to obtain release of a part from a mold coated with the inventive composition. As indicated by the graph, the ease of release and amount of energy required to release the part from the mold coated with the composition remained substantially level over the first 11 uses (releases). This indicates the durability of the coating within a commercially acceptable release profile. After 11 releases, the energy required to release the part increased slightly. This also correlated with a decrease in surface energy.

This date suggests that after 11 releases, a "touch-up" coating may be useful to ensure ease of release values remain predictable and as low as possible and to ensure acceptable molded part results.

The invention claimed is:

1. A mold release composition comprising:
   a) at least one siloxane polymer having functional terminal groups;
   b) at least one siloxane polymer having at least one functional pendent group, wherein said at least one functional pendent group includes a member selected from the group consisting of amino, thio and halo groups; and
   c) a condensation crosslinking agent, having the structure:

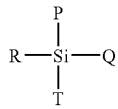

wherein R is H, $C_{1-2}$ alkyl or $C_{2-6}$ alkyl;
P, Q and T may be the same or different and are selected from the group consisting of H, alkoxy, acetoxy or halo.

2. The composition of claim 1, wherein the siloxane having functional pendent groups has the structure:

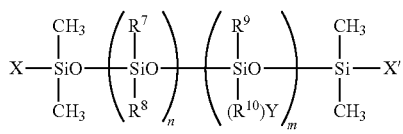

wherein X and X' may be same or different and are selected from the group consisting of:
   $C_{1-4}$ alkyl, allyl, $C_{1-4}$ alkoxyl, hydroxy, carbinol, acryloxy, acetoxy, halo, epoxypropoxypropyl, acryloxyhydroxypropyl, acryloxypropyl aminopropyl and amino;
   Y is selected from the group consisting of amino, thio and halo;
   $R^7$, $R^8$, $R^9$ may be the same or different and may be H or $C_{1-6}$ alkyl;
   $R^{10}$ is $C_{1-5}$ alkyl;
   n is 1-50,000; and
   m is 1-200.

3. The composition of claim 2, wherein X is selected from the group consisting of $C_{1-4}$ alkyl and $C_{1-4}$ alkoxy and Y is selected from the group consisting of —$NH_2$ and —SH.

4. The composition of claim 1, wherein the siloxane polymer having functional terminal groups has the formula:

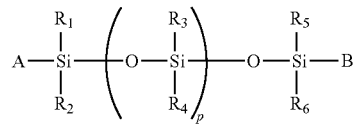

wherein $R^1$, $R^2$, $R^3$, $R^4$, $R^5$ and $R^6$ may be the same or different and are selected from the group consisting of $C_{1-6}$ alkyl; A and B may be the same or different and are selected from the group consisting of $C_{2-6}$ alkyl, $C_{1-4}$ alkoxy, hydroxy, carbinol, carboxy, acryloxy, acetoxy, halo, epoxypropoxypropyl, acryloxyhydroxypropyl, acryloxypropyl aminopropyl or amino and p is 1 to about 100,000.

5. The composition of claim 1, further including a member selected from the group consisting of a catalyst, a surfactant, an acidic pH adjuster, a wetting agent, a color indicator, an aqueous carrier and combinations thereof.

6. The composition of claim 5, wherein the catalyst is present in amounts of about 0.001% to about 0.5% by weight of the total composition.

7. The composition of claim 5, wherein the wetting agent is present in amounts of about 0.1% to about 1% by weight of the total composition.

8. The composition of claim 5, wherein the color indicator is selected from the group consisting of a dye, a pigment and a uv trace dye.

9. The composition of claim 1 in the form of an aqueous emulsion.

10. The composition of claim 9, wherein the emulsion comprises a combination of separately formed emulsions.

11. The composition of claim 1, wherein component a) is hydroxy terminated polydimethylsiloxane; component b) is an amino or thio pendent functional polydimethylsiloxane; and component c) is methyl triethoxy silane.

12. The composition of claim 1, wherein component a) is present in amounts of about 0.1% to about 5.0% by weight of the total composition.

13. The composition of claim 1, wherein component b) is present in amounts of about 0.2% to about 15% by weight of the total composition.

14. The composition of claim 1, wherein the crosslinking agent is present in amounts of about 0.2% to about 5.0% by weight of the total composition.

15. A method of preparing a fast curing water-based mold release composition comprising:
   a) providing a composition comprising:
      i) at least one siloxane polymer having functional terminal groups;
      ii) at least one siloxane polymer having functional pendent groups, wherein said functional pendent groups include a member selected from the group consisting of amino, thio and halo groups; and
      iii) a crosslinking agent; and
   b) emulsifying the composition with water.

16. A method of preparing a mold release coating comprising the steps of:
   a) applying a mold release composition comprising:
      i) at least one siloxane polymer having functional terminal groups;
      ii) at least one siloxane polymer having functional pendent groups, wherein said functional pendent groups include a member selected from the group consisting of amino, thio and halo groups; and iii) a condensation crosslinking agent, having the structure:

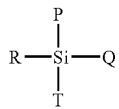

wherein R is H, $C_{1-2}$ alkyl or $C_{2-6}$ alkyl;
P, Q and T may be the same or different and are selected from the group consisting of H, alkoxy, acetoxy or halo; and
b) allowing the composition to cure.

17. The composition formed by the method of claim 16, having a surface tension of about 20 dye/cm or less.

18. A method of preparing a stabilized emulsion of a mold release composition comprising the steps of:
 a) forming a first oil-in-water emulsion comprising:
  i) a first component selected from the group consisting of at least one siloxane polymer having functional terminal groups, at least one polymer having functional pendent groups, wherein said functional pendent groups include a member selected from the group consisting of amino, thio and halo groups, a crosslinking agent and combinations;
  ii) a second component comprising at least one surfactant; and
  iii) a third component comprising water;
 b) forming a second oil-in-water emulsion comprising:
  i) selected from the group consisting of at least one siloxane polymer having functional terminal groups, at least one polymer having functional pendent groups, wherein said functional pendent groups include a member selected from the group consisting of amino, thio and halo groups, a crosslinking agent and combinations thereof, wherein the selection for components in the second oil-in-water emulsion is different than the first oil-in-water emulsion;
  ii) at least one surfactant; and
  iii) water; and
 c) combining the first oil-in-water emulsion with the second oil-in-water emulsion to form a third oil-in-water emulsion.

19. A method of preparing a stabilized emulsion of a mold release composition comprising the steps of:
 a) forming a first oil-in-water emulsion comprising:
  i) a first component comprising at least one siloxane polymer having functional terminal groups;
  ii) a second component comprising at least one surfactant; and
  iii) a third component comprising water;
 b) forming a second oil-in-water emulsion comprising:
  i) a first component comprising at least one polymer having functional pendent groups, wherein said functional pendent groups include a member selected from the group consisting of amino, thio and halo groups;
  ii) a second component comprising at least one surfactant; and
  iii) a third component comprising water;
 c) forming a third oil-in-water emulsion comprising:
  i) a first component comprising a crosslinking agent;
  ii) a second component comprising at least one surfactant; and
  iii) a third component comprising water; and
 d) combining the three emulsion to form a fourth oil-in-water emulsion.

* * * * *